Patented Dec. 8, 1953

2,661,963

UNITED STATES PATENT OFFICE 2,661,963

EXPANSION JOINT

Herbert F. Brown, Cranford, and Robert H. Maass, Madison, N. J., assignors to Standard Oil Development Company, a corporation of Delaware Application February 7, 1950, Serial No. 142,874

2 Claims. (Cl. 285—90)

This invention relates to expansion joints and more particularly to the application of coil springs to equalize the movement of multi-bellows type expansion joints.

In the equipment used in high temperature processes, it is necessary to use expansion joints in the piping systems to take care of expansion and contraction due to differences in temperature. It is customary to build such piping systems so that two pipes are interconnected by means of a bellows-like plurality of annular units. When employing such construction in the piping used in the transportation of fluidized catalyst and hot gases through a system for the catalytic cracking of hydrocarbons, it is usual to employ a plurality of these bellows-like units, interconnected by means of tie rods carrying limit stops adapted to prevent excess contraction and expansion of the bellows.

However, when such a construction is used, it has been found that the movement of the joint was not uniform throughout the various groups of bellows. As the bellows annular units or elements are relatively thin and wide, they offer little resistance to extension or compression.

In vertical joints the top bellows groups may become fully extended against the limit stops while the lower bellows groups may become fully compressed to the limit stops. It is apparent that the weights of the various sections of the joint are sufficient to extend the upper bellows and compress the lower bellows to their limit stops. This extreme movement during normal operation is undesirable since the limit stops are designed for emergency movements and the bellows are thus stressed beyond their design allowable stress when moved to the limit stops.

In horizontal joints the frictional forces developed by the various parts of the expansion joint such as the tie rods and sleeves may prevent the equal distribution of the total movement among the several bellows.

According to the present invention, the above disadvantages are overcome by providing coil springs on the outer ends of each of the tie rods. These springs exert a force relatively large in comparison to the weight of the component parts of the joint but less than the structural strength of the piping. Overall tie rods with coil springs are also provided to overcome the compressive effects of the individual bellows springs and allow the joint to function as an independent unit.

Certain preferred details of construction together with additional objects and advantages will be apparent and the invention itself will be best understood by reference to the following specification and to the accompanying drawings wherein.

Figure 1:
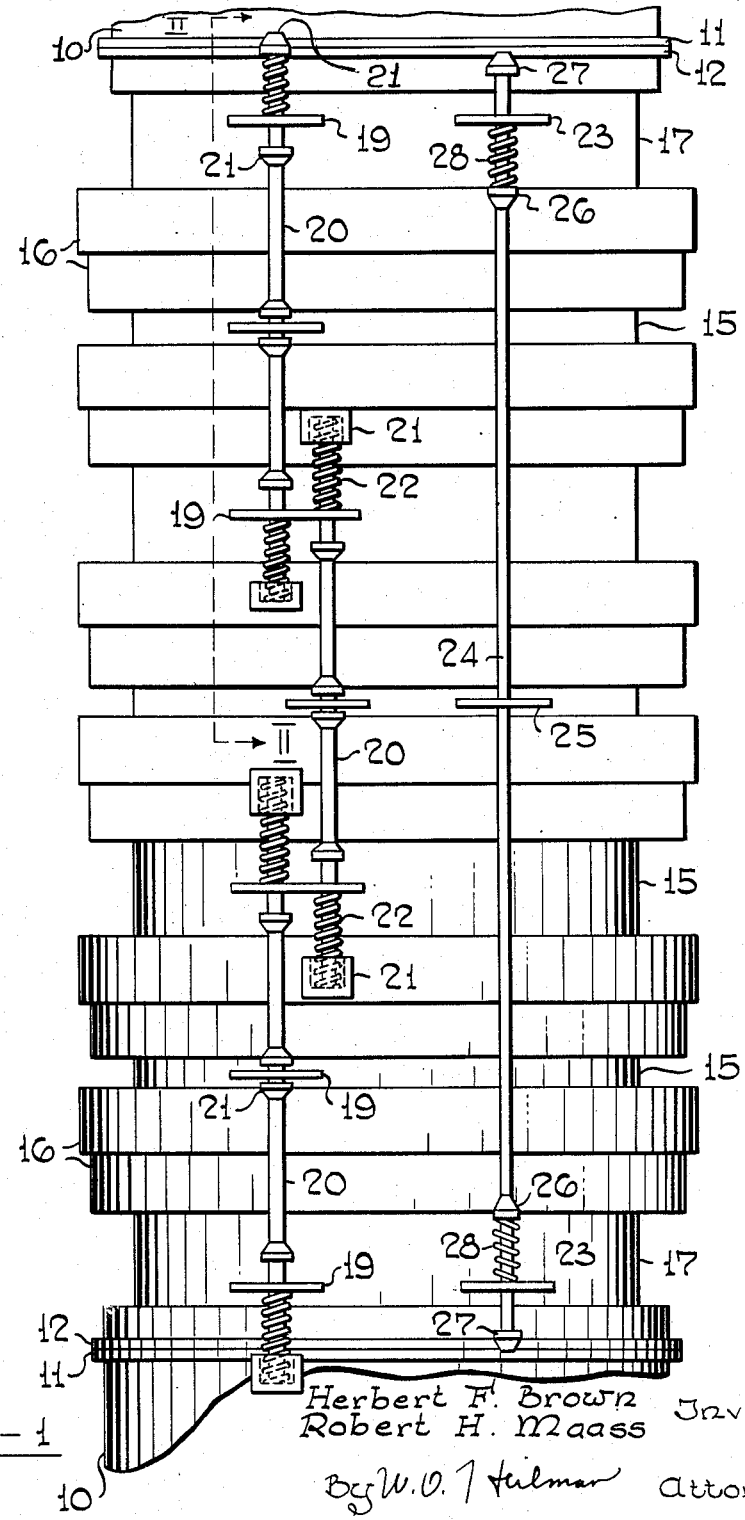
Figure 1 represents an elevation of a portion of a piping system including an expansion joint showing the tie rods equipped with the equalizing springs of this invention.
Figure 2:
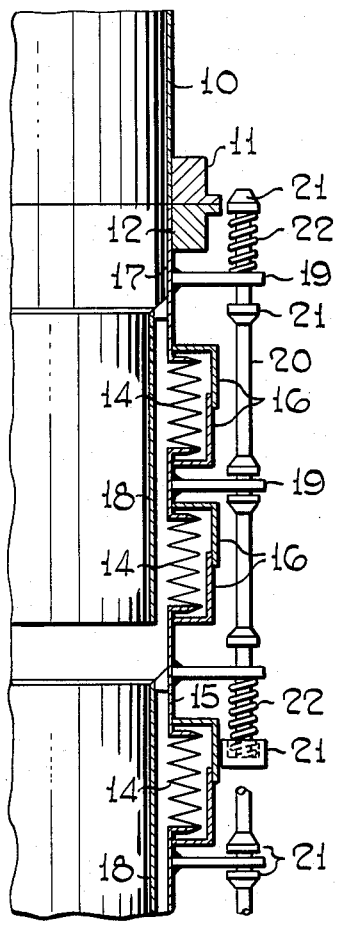
Figure 2 is a vertical cross-section of the expansion joint taken substantially along line 2—2 of Figure 1.

Referring now to the drawings, the reference character 10 designates a pipe having a flange 11 to which is secured a flange 12.

The expansion joint proper comprises a plurality of separate expansible and contractible metal elements 14 which are separated by metal sleeves 15. Each expansible and contractible section is enclosed by telescoping cases 16. Instead of using the expansion joint shown, other expansion joints comprising continuous corrugations or bellows may be used. In the form of expansion joint shown in the drawings the expansible and contractible sections 14 are attached to sleeves 17 which carry the flanges 12 of the expansion joint.

To prevent the fluid which passes through the joint from entering the expansible and contractible sections, an internal metal sleeve 18 is provided for each expansible and contractible section. A bracket 19 attached to sleeves 15 and 17 is provided between each expansible and contractible section 14 and is adapted to movably support tie rods 20. As shown in the drawing, a single tie rod is used for each two expansible and contractible section but this arrangement may be changed as desired. Each tie rod 20 is provided with limit stops 21. Between the topmost and lowermost limit stops 21 on each tie rod and the adjacent bracket 19 there is provided, surrounding the rod 20, a coil spring 22 extending from the limit stop to the bracket. Sleeves 17 also carry brackets 23 which are adapted to movably support tie rod 24 running the entire length of the expansion joint. Tie rod 24 is also preferably additionally supported by one or more brackets 25 attached to sleeve 15. This overall tie rod 24 is provided with interior limit stops 26 and exterior limit stops 27 near the upper and lower ends of rod 24. Between interior limit stop and the adjacent bracket 23 there also is provided coil springs 28 surrounding the rod 24 extending from the limit stop to the bracket. By this arrangement, the entire series of bellows units are forced to move as a unit and thus excessive stresses due to the weight of the joint are eliminated and the movement of the various bellows units are equalized. The emergency movement, i. e., distance from the face of the stop 21 to the face of the bracket 19, is the same for all limit stops in each individual joint, but the length of the springs must vary in order to support different loads. Thus, the length of each spring increases from the uppermost tie rod to the lowest in proportion to the decrease in weight that each spring supports.

The nature and objects of the present invention having been thus described and illustrated, what is claimed as new and useful and is desired to be secured by Letters Patents is:

1. In an expansion joint of the character described, including at least two sets of expansion joint units, each having at least two annular bellows expansion members disposed in end to end opposed longitudinally spaced relation with the expansion members in each set secured to and spaced by a series of annular rigid sleeve members of which one sleeve member is common to adjoining sets, a circumferential series of brackets on each sleeve member extending radially outward therefrom and longitudinally aligned from sleeve member to sleeve member, of which said brackets on said sleeve member common to adjoining sets are duel brackets, a first series of longitudinal tie rods extended through the brackets on said sleeve members in each set, each rod having limit stops thereon disposed in spaced relation to each side of each bracket in the set, with the outermost ends of the rods in one set overlapping the outermost ends of the rods in another set in said dual brackets, a separate circumferential series of bracket elements on the outermost members only of said series of sleeve members, and a second series of tie rods extended through said separate brackets the entire length of said joint, each rod having an outer limit stop and an inner limit stop disposed in spaced relation to each other and to each side of each separate bracket; the improvement which comprises a coil spring intermediate each outermost limit stop on said first series of rods and each adjacent bracket, encircling the rod and acting in opposition to each other on each rod, and to said springs on the outermost end of an overlapping rod against a dual bracket, and a coil spring at each end of each of said second series of rods intermediate each inner limit stop and said separate brackets for said rods, acting in opposition to each other on the same rod and to the spring on an adjoining end of a rod in said first series of rods.

2. An expansion joint according to claim 1 in which said joint extends vertically upward and in which the length of each spring element in a longitudinal series of spring elements increases from top to bottom of said series and substantially in proportion to the load thereon.

HERBERT F. BROWN.
ROBERT H. MAASS.

References Cited in the file of this patent
UNITED STATES PATENTS

| Number | Name | Date |
|---|---|---|
| 235,474 | Watkins | Dec. 14, 1880 |
| 1,573,511 | Belcher | Feb. 16, 1926 |
| 2,493,404 | Haynes | Jan. 3, 1950 |